United States Patent
Krasnow et al.

(10) Patent No.: US 10,318,494 B2
(45) Date of Patent: Jun. 11, 2019

(54) ANALYZING AND VISUALIZING TRENDS IN THE USE AND CONSUMPTION OF DATA IN A SHARED STORAGE SYSTEM

(71) Applicant: Qumulo, Inc., Seattle, WA (US)

(72) Inventors: Michael Adam Krasnow, Seattle, WA (US); Eric Jonathan Wright, Seattle, WA (US); Michael Liau, Seattle, WA (US); Alixandra Ming-Yi Han, Seattle, WA (US); Thomas R. Unger, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 286 days.

(21) Appl. No.: 15/288,853

(22) Filed: Oct. 7, 2016

(65) Prior Publication Data
US 2018/0101546 A1   Apr. 12, 2018

(51) Int. Cl.
*G06F 16/185* (2019.01)
*G06F 16/17* (2019.01)

(52) U.S. Cl.
CPC ........ *G06F 16/185* (2019.01); *G06F 16/1734* (2019.01)

(58) Field of Classification Search
CPC ......... G06F 17/30221; G06F 17/30144; G06F 16/1734; G06F 16/185
USPC ....................................................... 707/829
See application file for complete search history.

(56) References Cited

U.S. PATENT DOCUMENTS

| | | | | |
|---|---|---|---|---|
| 7,636,743 B2* | 12/2009 | Erofeev | ................. | G06F 16/184 |
| 8,364,648 B1* | 1/2013 | Sim-Tang | ................ | G06F 16/20 707/674 |
| 8,612,404 B2* | 12/2013 | Bone | ................. | G06F 17/30144 707/637 |
| 2008/0288306 A1* | 11/2008 | MacIntyre | ......... | G06F 17/30536 705/7.29 |
| 2013/0191355 A1* | 7/2013 | Bone | ..................... | G06F 16/122 707/694 |

(Continued)

OTHER PUBLICATIONS

Chimera, Richard, "Value Bars: An Information Visualization and Navigation Tool for Multi-attribute Listings", CHI '92, Monterey, CA, May 3-7, 1992, pp. 293-294.*

(Continued)

*Primary Examiner* — Robert Stevens
(74) *Attorney, Agent, or Firm* — John W. Branch; Lowe Graham Jones PLLC

(57) ABSTRACT

A facility comprising methods and systems for analyzing and visualizing trends in the usage of data within a shared storage filesystem is disclosed. The facility analyzes the rate at which the filesystem or a portion thereof is used by periodically generating manifests of the usage of the filesystem and comparing one manifest to another manifest. Furthermore, the facility may store additional information relevant to the manifest, such as the time at which the manifest was taken; for each directory, the sum of all of the values determined for items in that directory (including any subdirectories); and so on. In this manner, the facility collects and stores information relevant to developing trend information for each item in the filesystem. The trends analysis and visualizations described herein provide quick insight into the changes deemed most interesting or significant between two times.

20 Claims, 8 Drawing Sheets

(56) References Cited

U.S. PATENT DOCUMENTS

| | | | | |
|---|---|---|---|---|
| 2014/0372607 A1* | 12/2014 | Gladwin | ................. | H04L 67/16 |
| | | | | 709/224 |
| 2015/0242263 A1* | 8/2015 | Klose | ..................... | G06Q 10/06 |
| | | | | 714/47.3 |
| 2017/0046143 A1* | 2/2017 | Kochhar | ................... | G06F 8/60 |
| 2017/0091046 A1* | 3/2017 | Bangalore | ........... | G06F 11/1451 |
| 2017/0286455 A1* | 10/2017 | Li | ..................... | G06F 17/30528 |

OTHER PUBLICATIONS

Cudre-Mauroux, Philippe, et al., "TrajStore: An Adaptive Storage System for Very Large Trajectory Sets", ICDE 2010, Long Beach, CA, Mar. 1-6, 2010, pp. 109-120.*

* cited by examiner

ANALYZING AND VISUALIZING TRENDS IN THE USE AND CONSUMPTION OF DATA IN A SHARED STORAGE SYSTEM

CROSS-REFERENCE TO RELATED APPLICATION(S)

This application is related to U.S. Provisional Application No. 62/181,111 entitled "FILESYSTEM HIERARCHICAL CAPACITY QUANTITY AND AGGREGATE METRICS," filed on Jun. 17, 2015; U.S. Provisional Application No. 61/982,926 entitled DATA STORAGE SYSTEM," filed on Apr. 23, 2014; U.S. Provisional Application No. 61/982,931 entitled "DATA STORAGE SYSTEM," filed on Apr. 23, 2014; U.S. Non-Provisional application Ser. No. 14/595,043 entitled "FILESYSTEM HIERARCHICAL AGGREGATE METRICS," filed on Jan. 12, 2015; U.S. Non-Provisional application Ser. No. 14/595,598 entitled "FAIR SAMPLING IN A HIERARCHICAL FILESYSTEM," filed on Jan. 13, 2015; U.S. Non-Provisional application Ser. No. 14/658,015 entitled "DATA MOBILITY, ACCESSIBILITY, AND CONSISTENCY IN A DATA STORAGE SYSTEM," filed on Mar. 13, 2015; and U.S. Non-Provisional application Ser. No. 14/859,114, entitled FILESYSTEM HIERARCHICAL CAPACITY QUANTITY AND AGGREGATE METRICS, filed on Sep. 18, 2015, each of the above-mentioned applications is herein incorporated by reference in its entirety. In cases where the present application and a document incorporated herein by reference conflict, the present application controls.

TECHNICAL FIELD

The described technology is directed to the field of filesystems.

BACKGROUND

Enterprise filesystems can store large volumes of data on behalf of large numbers of users. These filesystems have thousands of accounts, each account storing any amount of data. Enterprises, businesses, and individuals alike now use large scale filesystems to store data that is remotely accessible via a network. Such filesystems are often accessible via closed (e.g., enterprise) and open (e.g., Internet) networks and allow concurrent access via multiple client devices. Furthermore, the amount of data stored for a particular account may grow or shrink without notice. Thus, the demand for scalable storage resources and the ability to provide rapid access to content stored thereby is a key concern to end-users.

DETAILED DESCRIPTION

Figure 1:
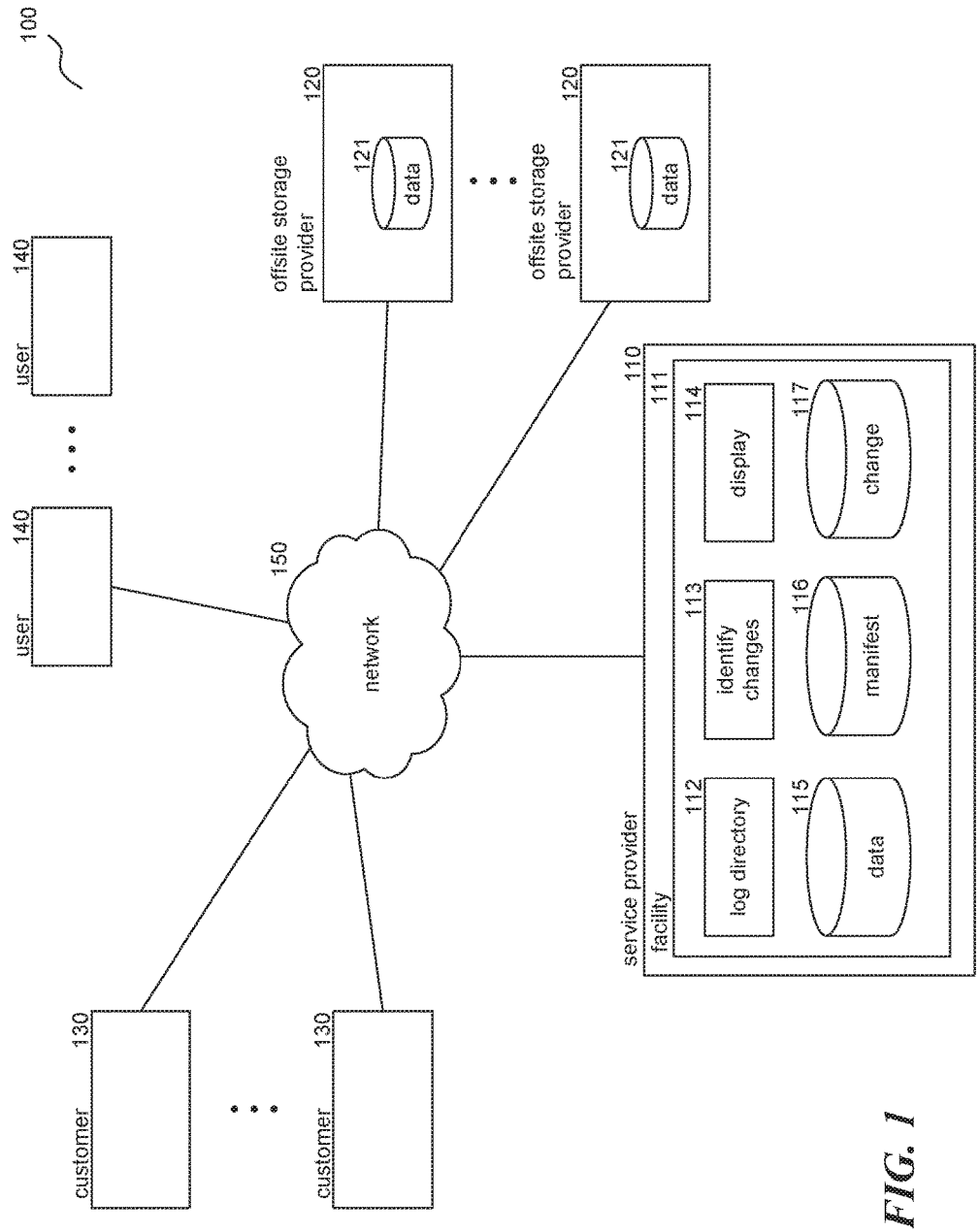
FIG. 1 is a block diagram illustrating an environment in which the facility may operate.

Users, such as account administrators and/or storage system managers, benefit from knowing the amount of storage resources in a filesystem, the allocation of those resources to various portions of the filesystem, such as directories, subdirectories, and files in a filesystem hierarchy, and the rate at which those resources are used and/or modified in order to facilitate management of the filesystem. For example, administrators can see what caused large changes in resource consumption and take appropriate action, such as allocating additional storage capacity to a user or account.

Filesystems can incur significant changes over time due to, for example, changes in the number of users accessing the filesystem, changes in the way users use the filesystem, changes in how data within the system is archived, and so on. For example, a user may execute a runaway script that results in the production of huge amounts of data over a weekend. Similarly, a user may upload the user's entire media library to the filesystem for backup purposes. Alternatively, a user may delete a significant amount of data that was being used as test data for a project that has terminated. In cases like this, it can be difficult for a system administrator to quickly and easily identify where and when significant changes have occurred. The inventors have recognized that a mechanism for analyzing and visualizing changes in data stored in a filesystem would have significant utility.

A facility comprising methods and systems for analyzing and visualizing trends in the usage of data within a shared storage filesystem is disclosed. The facility analyzes the rate at which the filesystem or a portion thereof (such as a cluster, subdirectory, etc.) is used by periodically (e.g., once per minute, hour, day, week, month, year, etc.) generating "manifests" of the usage of the filesystem and comparing one manifest to another manifest. Each manifest represents, for example, for each of a number of filesystem items at a particular point in time (or at some moment during a logging period), one or more quantities (e.g., capacity) and associated dimensions (e.g., paths). For example, the facility may regularly determine an appropriate value associated with each item (e.g., directories and files) within a filesystem, such as the size or capacity (i.e., the amount of storage space used) of each item, the number of times the item is accessed (reads and/or writes), and so on. The facility stores the determined value in association with a path corresponding to the directory or file, such as "/" for a root directory, "/dir1" for a subdirectory of the root directory, "/dir1/file1" for a file stored in the "dir1" subdirectory, and so on. Furthermore, the facility may store additional information relevant to the manifest, such as the time at which the manifest was taken or generated; for each directory, the sum of all of the values determined for items in that directory (including any subdirectories); and so on. In this manner, the facility collects and stores information relevant to developing trend information for each item in the filesystem at a moment in time. Furthermore, because manifests for a particular quantity or set of quantities can be generated at different times, each of the manifests can be mutually exclusive representations or "metadata snapshots" of the filesystem at a moment in time. This mutual exclusivity allows the facility to store a large amount of data at a high frequency while maintaining a great deal of fidelity for subsequent visualization and analysis. The trends analysis and visualizations described herein provide quick insight into the changes deemed most interesting or significant between two times.

In some embodiments, each manifest stores information for paths determined to be significant and relevant. The significance of an item may be based on a threshold determined for the values to be logged during generation of the manifest. For example, for trend information related to size or capacity, the facility may establish a threshold based on the overall amount of data currently stored in the filesystem, such as 0.001%, 0.01%, 0.1%, 1%, 5%, 10%, and so on of the overall amount of data stored. As another example, the facility may establish or determine a threshold for individual portions of the file system, such as a cluster within the filesystem assigned to a particular customer, and so on. In this manner, each user or account holder within the shared file system can specify or manipulate their own threshold for determining significance. Accordingly, an account holder storing 100 TB of data may establish a threshold of 0.1% (i.e., 0.1 TB) while an account holder storing 1 TB of data may establish a threshold of 1% (i.e., 0.01 TB). As another example, for trend information related to accesses, the facility may establish a threshold based on the overall number of accesses during a previous time period, such as the previous minute, hour, day, week, or month or between a current time and the time of a previous manifest, and so on. The significance of a file may change over time as the file or related information changes, as other files or related information within the filesystem change, as thresholds change, and so on. Identifying and visually representing only the filesystem items that are determined to be significant and relevant enables the facility to reduce a large, unconstrained filesystem to something more manageable and actionable by a user, such as a few highly significant paths for further analysis.

In some embodiments, the facility generates values for directories (including subdirectories) and files differently. For a file, the facility typically generates values based directly on the file or metadata associated with the file, such as the size of the file, the number and types of accesses of the file, and so on. However, some files may be irrelevant for purposes of generating a manifest (e.g., files that are too small). However, these files, and their associated attributes, may be attributable to a relevant directory in which they are stored (i.e., the ancestor directory providing the most insight about the attribute of interest, such as size, a number of accesses, and so on. For example, for a directory, the facility may generate a value based only on items within the directory that are not found to be significant or relevant and that are, therefore, otherwise "unaccounted for." The "unaccounted for" value represents a total or aggregated value for a directory (i.e., the size of all files in the directory (and its subdirectories), the total number of accesses in the directory, and so on) minus each determined value that can be attributed to a significant file or subdirectory with the directory. In other words, the relevance of a directory is based on the contents of the directory that are not significant (i.e., do not satisfy the significance threshold). Thus, a directory storing a single significant file may itself be irrelevant for purposes of generating a manifest while a directory storing many insignificant files may itself be relevant for purposes of generating a manifest. For example, at time $t_1$ a directory may store exactly two 1 TB files, file1 and file2, for a total of 2 TB. If a "significance threshold" for size is currently set to 1.5 TB, then the facility will not log the files during generation of a current manifest because the size of each file is less than 1.5 TB. Accordingly, the 2 TB in the directory are "unaccounted for" in the manifest and, therefore, attributable to the directory itself. Thus, the facility will log the directory itself during generation of a current manifest because its total "unaccounted for" size is 2 TB, which exceeds the 1.5 TB significance threshold and, therefore, the directory itself is relevant for purposes of generating a manifest. However, if at time $t_2$, file1 has increased in size to 2 TB and the significance threshold remains 1.5 TB, then the facility will log file1 in a current manifest because its size (2 TB) exceeds the significance threshold (1.5 TB). Neither the directory itself nor file2, however, will be logged in the current manifest because neither the size of the "unaccounted for" data in the directory nor the size of file2 exceeds the significance threshold. Thus, although the directory itself includes more than 1.5 TB of data, only 1 TB of that data is attributable to the directory for purposes of generating a manifest and, therefore, the directory is irrelevant for logging purposes. In other words, the relevance of a directory may be based on its appropriate "unaccounted for" value rather than its total or aggregated value. In this manner, values corresponding to a file can be attributed to the file itself without being replicated across or attributed to a corresponding directory (or chain of directories) so that irrelevant directories are not represented individually in a manifest. Storing the data in this manner allows the facility to construct a hierarchy for a single manifest that can be used to compute relevant differences between two manifests. In some embodiments, the facility may not log individual items within a directory if the number of files within the directory exceeds a predetermined threshold, such as 100, 1000, 10000, 100000, 10% of the number of items stored on the filesystem or in association with a particular account, and so on. In this manner, none of the files in the directory will be accounted for, and the directory itself will be logged in a manifest if the value determined for the directory itself exceeds the corresponding significance threshold.

Change data represents, for a given attribute, the extent to which an item in a filesystem has changed (or information about that item has changed), such as a file's size, the "unaccounted for" size of a directory, the "unaccounted for" reads/writes for a directory, and so on. In some embodiments, the facility generates change data relative to two manifests by comparing the value stored for one path in one manifest to the value stored for the same path in the other manifest. Thus, if a first manifest indicated that a file stored at /dir1/file1 was 4 TB and a later manifest indicated that the same file had grown to 6 TB, the facility would create change data indicating a growth of 2 TB. Alternatively, if the later manifest indicated that the same file had decreased in size to 1 TB, the facility would create change data indicating a reduction of 3 TB (i.e., −3 TB). If a path represented in the later manifest was not logged in the earlier manifest, the facility will treat the path as if its corresponding item did not exist during the first manifest. For example, a file that did not exist or was deemed insignificant during logging of size or capacity of a folder for the earlier manifest will be treated as though it had a size of 0 during the logging of the earlier manifest. Similarly, a file that did not exist or was deemed insignificant during logging of size or capacity of a folder for the later manifest will be treated as though it had a size of 0 during the logging of the later manifest. While this technique can decrease the accuracy of the change data, the inventors have recognized that the accuracy of this granular data can be less important than showing the most significant and relevant changes quickly.

In some embodiments, the facility generates visualization or display information representative of trends within the file system by retrieving or generating change data between a series of two or more manifests. For example, the facility may generate manifests for a filesystem at regular intervals (e.g., each hour, day, week, month, etc.) and then provide a visualization that represents the changes between successive manifests for a greater period of time, such as an entire month, quarter, year, and so on. Furthermore, the facility may include in the visualization information an indication of the filesystem items that represent the greatest changes over the corresponding period, such as files that have grown or reduced in size the most (e.g., top 1, top 5, top 10, top 10%, etc.), directories whose "unaccounted for" data has grown or reduced in size the most (e.g., top 2, top 100, top 20%, etc.), and so on. In some embodiments, the facility enables users to interact with the visualizations by selecting a particular indication of change data to "drill down" through to see more details about the changes during the corresponding period. In this manner, users can quickly and easily see how their stored data is changing over time in order to make appropriate storage management decisions. For example, change data for a particular directory may be represented in the form of a bar graph comprised of a series of vertical bars, each vertical bar representing a magnitude of change for the directory between two manifests (e.g., the extent to which the directory has grown or shrunk during that period). As another example, selecting one of the vertical bars may result in the display of horizontal bars, each horizontal bar corresponding to a different item in the directory and representing the magnitude of the change for that item during the period represented by the selected vertical bar (i.e., the period between the two corresponding manifests).

Thus, the disclosed facility provides significant improvements to the use of a computer in monitoring, analyzing, and visualizing trend data in a filesystem. The disclosed techniques improve upon previous techniques by intelligently identifying and filtering insignificant filesystem items so that the entire filesystem does not have to be traversed to identify significant changes. Accordingly, the disclosed facility provides significant advantages in terms of efficiency relative to conventional techniques.

FIG. 1 is a block diagram illustrating an environment in which the facility may operate in accordance with some embodiments of the disclosed technology. The environment 100 includes service provider 110, offsite storage providers 120, customers 130, users 140, and network 150. Service provider 110 provides the facility for analyzing and visualizing trends within a filesystem and is comprised of facility 111, log directory component 112, identify changes component 113, display component 114, data store 115, manifest data store 116, and change data store 117. Log directory component 112 is invoked by the facility to generate a manifest for a directory. Identify changes component 113 is invoked by the facility to calculate relevant changes between any two manifests. Display component 114 is invoked by the facility to generate visualization data for generated change data. Data store 115 represents data stored in the filesystem. In some embodiments, data store 115 may include additional stores, such as remote or distributed storage systems, and so on. Manifest data store 116 represents manifest data and may be stored in one location or distributed across other systems and facilities. Change data store 117 represents change data and may be stored in one location or distributed across other systems and facilities. Offsite storage providers 120 offer storage space for the filesystem and are comprised of data store 121. Accordingly, the facility is configured to analyze and visualize change data and trends for distributed and non-distributed filesystems. Customers 130 represent the filesystem accountholders and may include individuals, organizations, system administrators, and so on. These customers may have established relationships with the service provider 110 and/or offsite storage providers 120 and may interact with their corresponding filesystems directly or via network 150. Users 140 represent the users that interact with the filesystem, either directly or via network 150.

The computing devices on which the facility is implemented may include a central processing unit, memory, input devices (e.g., keyboard and pointing devices), output devices (e.g., display devices), and storage devices (e.g., disk drives), such as computer-readable storage media. Computer-readable storage media include, for example, tangible media such as hard drives, CD-ROMs, DVD-ROMS, and memories such as ROM, RAM, and Compact Flash memories that can store instructions and other storage media. The phrase "computer-readable storage medium" does not include propagating, transitory signals and should not be interpreted to include propagating, transitory signals. In addition, the instructions, data structures, and message structures may be stored or transmitted via a data transmission medium, such as a signal on a communications link and may be encrypted. The term "data transmission medium" should not be interpreted to include computer-readable storage media. Various communications links may be used, such as the Internet, a local area network, a wide area network, a point-to-point dial-up connection, a cell phone network, and so on and may be encrypted.

Embodiments of the facility may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The facility may be described in the general context of computer-executable instructions, such as program modules, executed by one or more computers or other devices. Further, such functions correspond to modules, which are software, hardware, firmware, or any combination thereof. Multiple functions can be performed in one or more modules as desired, and the embodiments described are merely examples. A digital signal processor, ASIC, microprocessor, or any other type of processor operating on a system, such as a personal computer, server computer, supercomputing system, router, or any other device capable of processing data including network interconnection devices executes the software. Those skilled in the art will appreciate that any logic illustrated in the Figures (e.g., flow diagrams), may be altered in a variety of ways. For example, the order of the logic may be rearranged, sublogic may be performed in parallel, illustrated logic may be omitted, other logic may be included, etc. Typically, the functionality of the program modules may be combined or distributed as desired in various embodiments.

While computer systems configured as described above are typically used to support the operation of the facility, those skilled in the art will appreciate that the facility may be implemented using devices of various types and configurations, and having various components. Furthermore, while various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
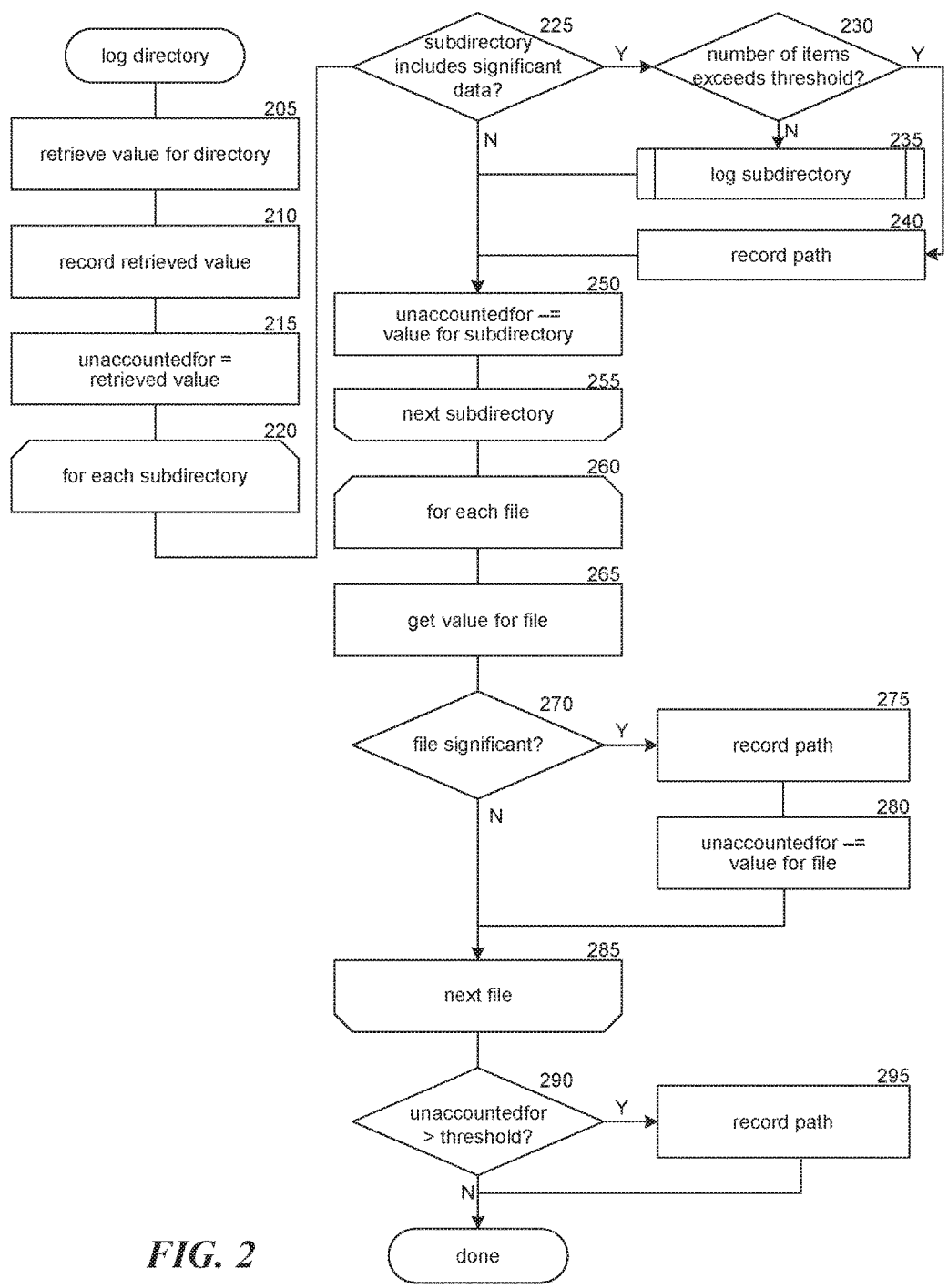
FIG. 2 is a flow diagram illustrating the processing of a log directory component.

FIG. 2 is a flow diagram illustrating the processing of a log directory component in accordance with some embodiments of the disclosed technology. The facility invokes the log directory component to generate a manifest for a directory and store the manifest information in a change data store. In this example, the processing of the log directory component is described in the context of logging change data for size or capacity. One of ordinary skill in the art will recognize that other attributes may be used as a basis for generating manifest data and/or determining whether an item in a filesystem is significant. In block 205, the component retrieves the current size or capacity of the directory. For example, the component may retrieve an aggregated size or capacity value stored in association with the directory. This aggregated value may be generated in accordance with the techniques described in U.S. Non-Provisional application Ser. No. 14/859,114, entitled FILESYSTEM HIERARCHICAL CAPACITY QUANTITY AND AGGREGATE METRICS, filed on Sep. 18, 2015, which is herein incorporated by reference in its entirety.

In block 210, the facility stores the retrieved value in association with the manifest by, for example, storing the value in a data structure representing and/or including the manifest. In block 215, the component initializes an "unaccountedfor" variable to the value of the retrieved value. In blocks 220-255, the component loops through each subdirectory of the directory to determine whether the subdirectory includes significant data by, for example, determining whether the size of the data stored in the subdirectory (and its subdirectories) exceeds a significance threshold, such as a predetermined size, a percentage of the size of the data stored in the filesystem, and so on. In decision block 225, if the subdirectory includes significant data, then the component continues at decision block 230, else the component continues at block 250. The component may determine whether the subdirectory is significant by retrieving an aggregated value such as those discussed above. In some embodiments, the significance of a directory may be based on another value, such as the name of the subdirectory, the users that access the subdirectory, the rate at which the subdirectory is read and/or written to, the age of the subdirectory, attributes (privileges, demographic information, usernames, etc.) of users that access the subdirectory, the number of items in the subdirectory, and so on. Thus, the facility allows for the production of significant trend data for a filesystem without traversing the entire filesystem.

In decision block 230, if the number of items in the directory (i.e., the number of files and first-level subdirectories) exceeds a predetermined threshold (e.g., 10, 500, 1000, 9999, 10% of files in the filesystem, etc.), the component continues at block 240, else the component continues at block 235. In block 235, the component invokes the log directory component for the currently-selected subdirectory. In some embodiments, rather than recursively invoking the log component for the subdirectory, the facility may add the subdirectory to a directory queue for the directory and process files in the subdirectory before advancing through the directory queue. In block 240, the component records the path for the directory in association with the value(s) to be logged, such as the size of all of the files in the currently-selected subdirectory (including any subdirectories). In block 250, the component subtracts the size of the subdirectory from the "unaccountedfor" variable. In block 255, the component loops back to block 220 to select another subdirectory if there are any left to be processed; otherwise the component continues at block 260.

In blocks 260-285, the component loops through each file in the directory to determine whether the file is significant and is to be logged. In block 265, the component determines the size of the file. In decision block 270, if the file is significant, then the component continues at block 275, else the component continues at block 285. The component may determine whether the file is significant by, for example, determining whether the size of the file exceeds a significance threshold, such as a size, a percentage of the size of the data stored in the filesystem, and so on. In some embodiments, the significance of a file may be based on another value, such as the name of the file, the users that access the file, the rate at which the file is read and/or written to, the age of the file, attributes (privileges, demographic information, usernames, etc.) of users that access the file, and so on. In block 275, the component records the path for the file in association with the value to be logged (e.g., the size of the file). In block 280, the component subtracts the size of the file from the "unaccountedfor" variable. In block 285, the component loops back to block 260 if there are any files in the directory left to be processed; otherwise the component continues at decision block 290. In decision block 290, if the current value of the "unaccountedfor" variable exceeds a threshold, thereby indicating that the directory is relevant for logging purposes, then the component continues at block 295, else the component completes processing. For example, the facility may compare the "unaccountedfor" variable to a relevance threshold to determine whether the directory is relevant for purposes of generating the manifest. In some embodiments, the relevance threshold may be based on and/or equal to the significance threshold. In some embodiments, the relevance threshold may be independent of the significance threshold. In block 295, the component records the path for the directory in association with the value(s) to be logged for the present manifest, such as the "unaccountedfor" value for the file. In some embodiments, rather than continuing at decision block 290, the component dequeues or pops the next subdirectory from a directory queue and invokes the log directory component for the dequeued directory. The facility proceeds until the directory queue is empty before proceeding to decision block 290.

Figure 3:
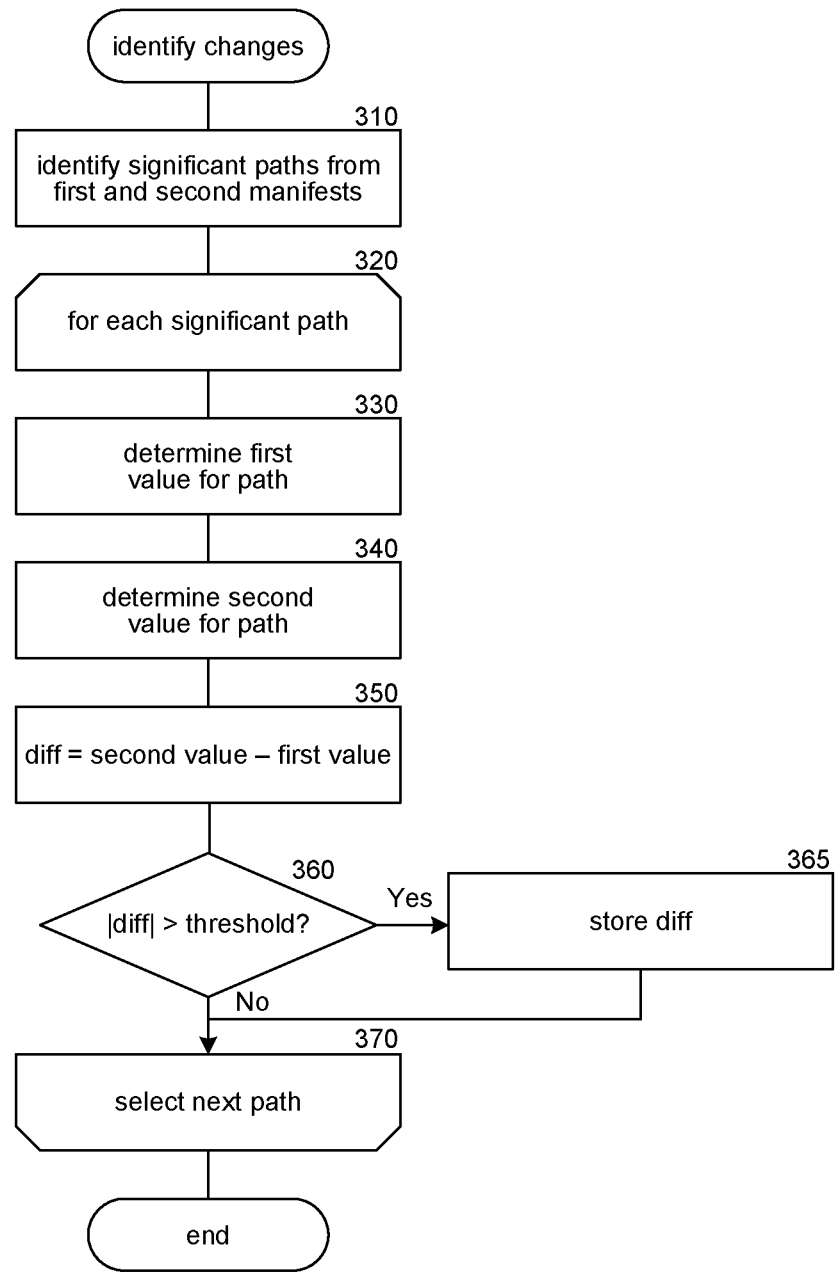
FIG. 3 is a flow diagram illustrating the processing of an identify changes component.

FIG. 3 is a flow diagram illustrating the processing of an identify changes component in accordance with some embodiments of the disclosed technology. The identify changes component is invoked to generate trend data between two manifests, a first manifest occurring at time $t_1$ and a second manifest occurring at a time $t_2$ later than $t_1$. In block 310, the component identifies the paths that have been logged in each of the first and second manifests. In blocks 320-370, the component loops through each path to determine how the values for the logged paths have changed between the two manifests. In block 330, the component retrieves a first value for the currently-selected path from the first manifest. For example, if the manifests logged the size of each item corresponding to each significant path at time $t_1$, then the component would retrieve the size of the corresponding item at time $t_1$. As another example, if the manifests logged the number of accesses of an item corresponding to each significant path at time $t_1$, then the component would retrieve the number of accesses of the corresponding item at time $t_1$. If the path does not exist in the first manifest, then the component sets the first value to a default value, such as 0. For example, if the item corresponding to the path was created after time $t_1$ or was not considered significant at time $t_1$, its path would not have been logged at time $t_1$. In block 340, the component retrieves a second value for the currently-selected path from the second manifest. If the path does not exist in the second manifest, then the component sets the second value to a default value, such as −1. For example, if the item corresponding to the path existed at time $t_1$ but was deleted or renamed before time $t_2$ or was not considered significant at time $t_2$, its path would not have been logged at time $t_2$. In block 350, the component calculates a diff value by subtracting the determined first value from the determined second value. In decision block 360, if the absolute value of the calculated diff value exceeds a threshold, then the component continues at block 365, else the component continues at block 370. For example, the threshold may be predetermined or may be based on the overall size of the corresponding changes in the filesystem. In block 365, the component stores the calculated diff value. In block 370, the component loops back to block 320 if there are any significant paths left to be processed; otherwise processing of the component completes.

Figure 4:
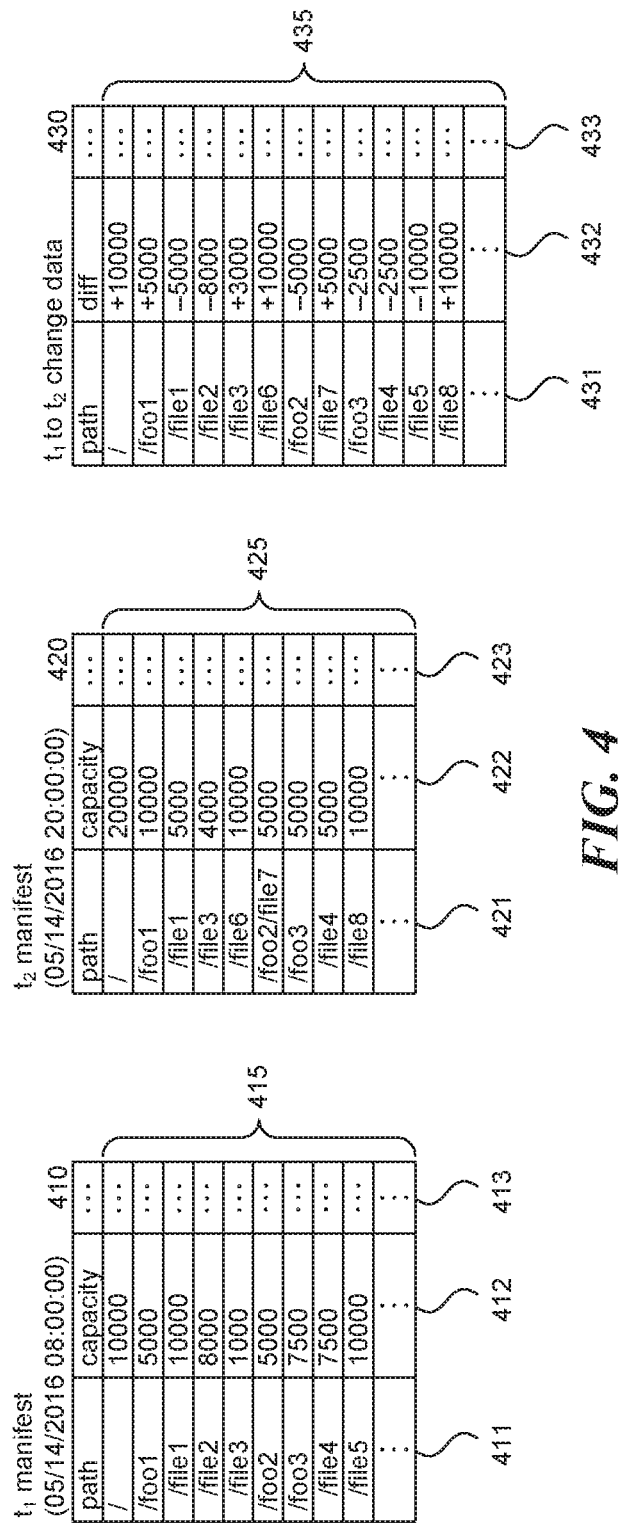
FIG. 4 is a data structure diagram illustrating portions of two manifest data structures and one change data structure.

FIG. 4 is a data structure diagram illustrating portions of two manifest data structures 410 and 420 and one change data structure 430 in accordance with some embodiments of the disclosed technology. In this example, each manifest data structure includes a column for each path logged in the manifest and a size or capacity value for each logged item, such as a file size for each logged file and an "unaccountedfor" value for each logged directory. One of ordinary skill in the art will recognize that additional values can be logged during generation of each manifest and represented in the corresponding data structure, such as accesses (read and/or writes), and so on. Manifest data structure 410 stores information logged during a manifest of directory "/" at 8 AM on May 14, 2016. Manifest data structure 420 stores information logged during generation of a manifest of directory "/" at 8 PM on May 14, 2016. Rows 415 and 425 represent the information that was logged during generation of each corresponding manifest, including path columns 411 and 421, each of which stores an indication of the logged path, and value columns 412, 413, 422, and 423, each of which stores a logged value or values for the corresponding path. For example, manifest data structure 410 shows that at time $t_1$ the size or capacity of the file stored at "/foo1/file1" was 10000 MB, while manifest data structure 420 shows that at time $t_2$ the same file had a size of 5000 MB. As another example, manifest data structure 410 shows that at time $t_1$ the "unaccountedfor" value of the "/foo3" directory was 7500 MB while manifest data structure 420 shows that at time $t_2$ the same directory had an "unaccountedfor" value of 5000 MB. As another example, manifest data structure 410 shows that at time $t_1$ the "unaccountedfor" value of the "/foo2" directory was 5000 MB while manifest data structure 420 shows that at time $t_2$ the same directory was not logged, indicating that it had an "unaccountedfor" value that did not exceed the significance threshold for manifest 420. As another example, manifest data structure 420 shows that at time $t_2$ the size of the file stored at "/foo3/file8" was 10000 MB while manifest data structure 410 does not include an entry for this path, indicating that at time $t_1$, the filesystem did not include a file at "/foo3/file8" or, if it did, the file did not exceed the significance threshold for manifest data structure 410. Change data structure 430 represents differences in logged values (i.e., diff values) between manifest data structures 410 and 420. Rows 435 represent the information that was logged during generation of change data based on manifest data structures 410 and 420, including path column 431, diff column 432, each of which stores a generated diff value for the corresponding path, and columns 433, which can store additional change data for each path. For example, change data structure 430 indicates that the value logged for the file stored at "/foo1/file1" decreased 5000 MB; the "unaccountedfor" value of the "/foo3" directory decreased 2500 MB; the "unaccountedfor" value of the "/foo2" directory decreased 5000 MB; the value logged for the file stored at "/foo2/file7" increased 5000 MB; the value logged for the file stored at "/foo3/file8" increased 10000 MB; the "unaccountedfor" value for the directory at "/foo1" increased 5000 MB; and so on. In some embodiments, the facility may filter insignificant and irrelevant changes from the change data by applying significance and relevance thresholds to the changes values. In this manner, the facility can filter insignificant and irrelevant change data for filesystem items, prior to storing the change data, in a manner similar to how the facility filters insignificant and irrelevant filesystem items from the generation of manifests.

In some cases, the significance of a filesystem item may change due to changes in the filesystem itself rather than a change in the filesystem item, such as an overall growth or decay in the size or capacity of the filesystem. In these cases, the facility may perform additional filtering to reduce inaccurate or misleading information. For example, if the manifest generated at time $t_2$ shows that a filesystem item was not deemed significant (i.e., the item was not logged) at that time and the absolute value of the corresponding change for the item from time $t_1$ to time $t_2$ is less than a predetermined threshold (e.g., two times the significance threshold at time $t_2$), then the change for the filesystem item can be treated as insignificant and not logged in the change data. In this manner, filesystem items that have become insignificant at time $t_2$ due to changes in the filesystem, as opposed to changes in the items themselves, are not considered deletions when it is impossible to determine what happened to the filesystem item from the manifest and change data alone. Similarly, if the manifest generated at time $t_1$ shows that a filesystem item was not deemed significant (i.e., the item was not logged) at that time and the absolute value of the corresponding change for the item from time $t_1$ to time $t_2$ is less than a predetermined threshold (e.g., two times the significance threshold at time $t_1$), then the change for the filesystem item can be treated as insignificant and not logged in the change data. In this manner, filesystem items that were insignificant at time $t_1$ but became significant at time $t_2$ due to changes in the filesystem, as opposed to changes in the items themselves, are not considered additions to the filesystem when it is impossible to determine what happened to the filesystem item from the manifest and change data alone.

One skilled in the art will appreciate that while FIG. 4 provides an illustration that is easily comprehensible by a human reader, the actual information may be stored using different data structures and data organizations, such as a tree structure (e.g., binary tree, b-tree, timestamped tuple tree, etc.), comma separated values files, list, and so on and include additional information, such as a timestamp for the manifest, such as the time at which logging of the manifest began or ended, an indication of the number of items logged during the generation of the manifest, sum values for each directory (e.g., the total size of significant files and subdirectories logged for a given directory), and so on. As another example, a change data structure may store, for each path, both values from the corresponding manifest data structures instead of, or in addition to, the corresponding diff values, sum values for each directory, and so on. Similarly, one of ordinary skill in the art will recognize that manifests may be logged or generated at any interval.

Figure 5:
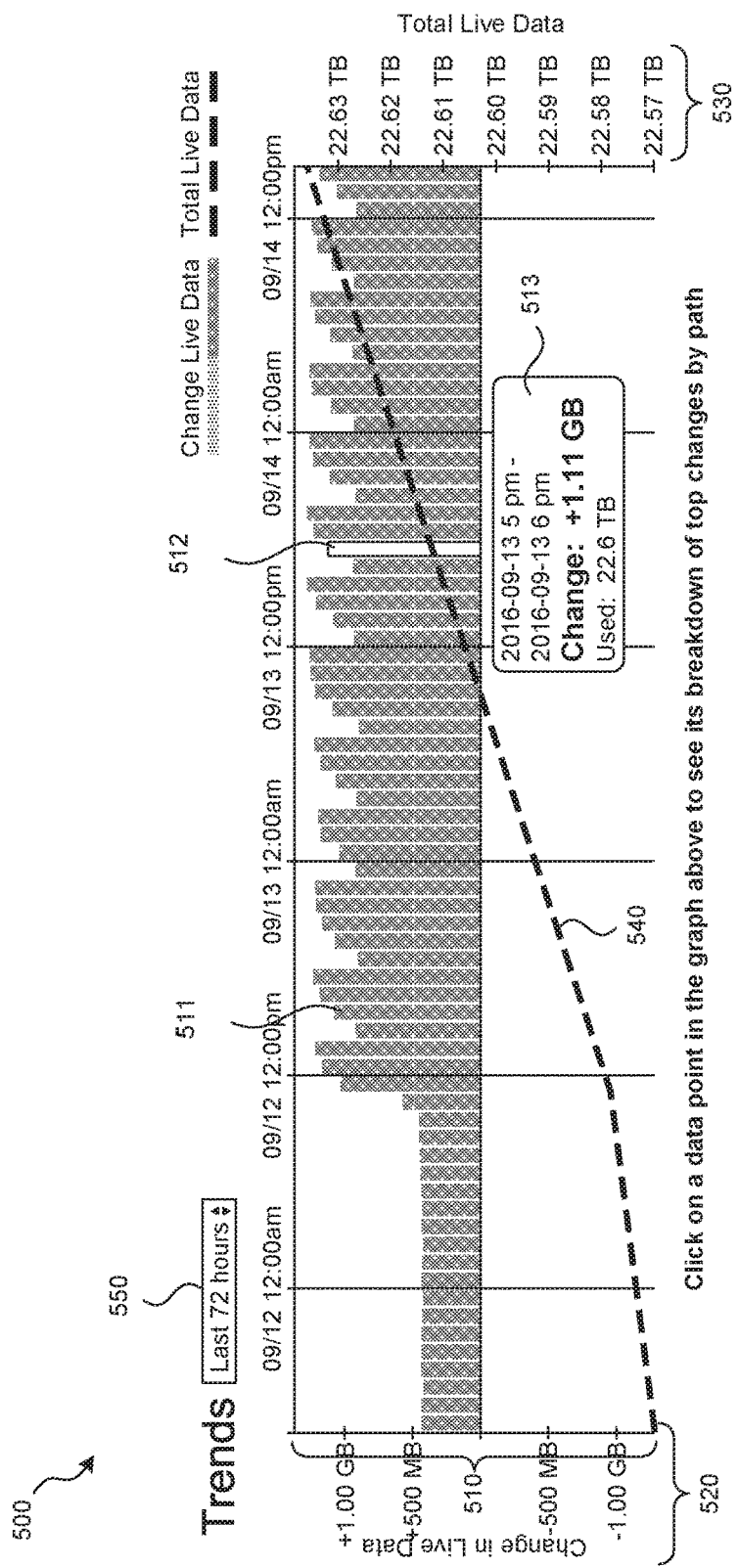
FIG. 5 is a display diagram showing an example screenshot of a user interface configured to display visualization information for trend data.

FIG. 5 is a display diagram showing an example screenshot of a user interface configured to display visualization information for trend data in accordance with some embodiments of the disclosed technology. In this example, the user interface includes visualization information for a filesystem (or a portion thereof) that has been logged hourly over the course of 72 hours. For example, visualization information may be generated for an entire filesystem, for the portion of a filesystem dedicated to a particular accountholder or customer, for a specific directory of a filesystem (and its subdirectories), and so on. As shown, display 500 includes change data bars 510, change axis 520, total axis 530, total line 540, change preview dialog 513, and range selection tool 550. Each of the change data bars 510 represents the extent to which the measured variable changed for the represented filesystem between two corresponding manifests (e.g., two sequential or non-sequential manifests). For example, comparing change bar 510 to change axis 520 shows that the size of the data stored in the filesystem increased by just over 1.0 GB between the two manifests preceding 12:00 pm on September 12. As discussed above, this information may be retrieved directly from (or by analyzing) a change data structure or generated by comparing two manifest data structures generated for the filesystem. For example, a change data bar could be generated for the "I" directory represented in change data structure 430 by retrieving the corresponding value from the change data structure 430 (i.e., +10000) or by comparing the corresponding values stored in manifest data structures 410 and 420. In some embodiments, the facility applies significance and relevance thresholds to the filesystem items represented in a change data structure prior to or while generating a display. In this manner, the facility can determine which changes will be most interesting to a user and, in turn, create a useful display for the user. For example, the facility may compare a significance threshold to the change values stored for each filesystem item to determine whether the filesystem item is significant for purposes of generating a display. Additionally, the facility may determine how much of the change for a directory is attributable to the directory (i.e., "unaccounted for" by significant changes to files in the directory), as opposed to files within the directory, and compare the determined value to a relevance threshold to determine whether the directory is relevant. Thus, the facility can filter insignificant and irrelevant change data, prior to displaying the change data, in a manner similar to how the facility filters insignificant and irrelevant filesystem items during the generation of manifests.

In some embodiments, the facility may provide more detailed information for each change bar. For example, selecting change bar 512 (i.e., clicking on the change bar, moving a mouse or other selection tool over the change bar) results in the display of change preview dialog 513. Change preview dialog 513 shows that one manifest used to generate the corresponding change data occurred (e.g., began or ended) at 5 pm on Sep. 13, 2016 while the other manifest used to generate the corresponding change data occurred at 6 pm on Sep. 13, 2016. Change preview dialog 513 further shows that between the two manifests used to generate the corresponding change data, the filesystem grew 1.11 GB resulting in a total capacity used of 22.6 TB. Total line 540 represents the total size or capacity of the information stored in the filesystem during each of the corresponding time periods represented in the display. For example, comparing total line 540 to total axis 530 shows that the size of the data stored in the filesystem was approximately 22.5 TB at 12:00 pm on September 12. In this example, all of the change bars 510 are positive, showing that the size or capacity of the filesystem has increased between each manifest. Accordingly, total line 540 is steadily increasing in this example. As discussed above, this information may be recorded and logged during the manifest process by, for example, analyzing all of the represented items in the filesystem or by retrieving aggregated values for the corresponding directory. Range selection tool 550 allows a user to change the range of change bars shown in the display, such as one hour, 24 hours, 72 hours, one week, 30 days, one quarter, six months, 52 weeks, a decade, and so on.

Figure 6:
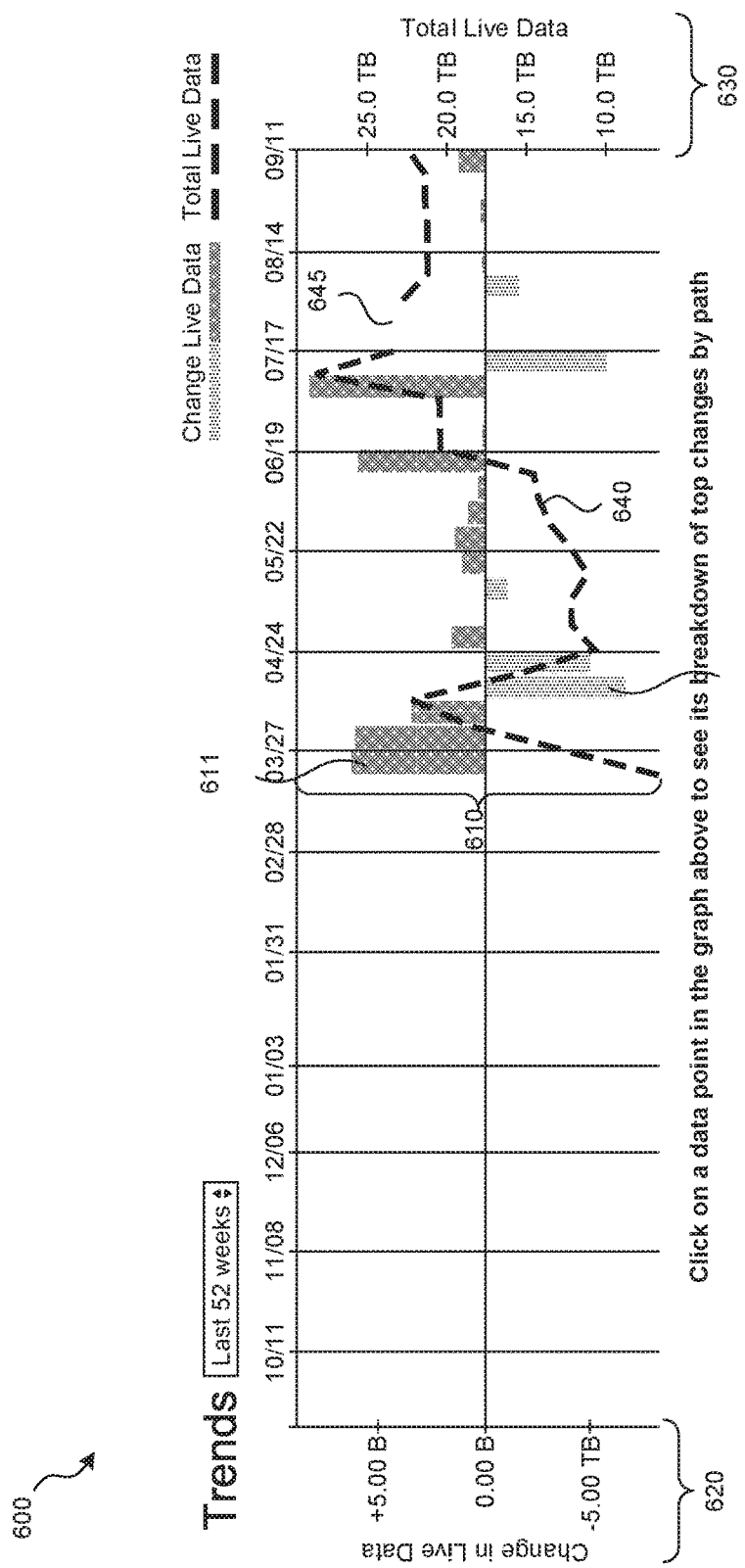
FIG. 6 is a display diagram showing an example screenshot of a user interface configured to display visualization information for trend data.

FIG. 6 is a display diagram showing an example screenshot of a user interface configured to display visualization information for trend data in accordance with some embodiments of the disclosed technology. In this example, the user interface includes visualization information for a filesystem (or a portion thereof) that has been logged several times over the course of 52 weeks. As shown, display 600 includes change data bars 610, change axis 620, total axis 630, and total line 640. In this example, the change bars 610 show that the size or capacity of the filesystem has periods of growth and periods of decay. For example, change bar 611 shows a period of growth between two manifests while change bar 612 shows a period of decay. Accordingly, total line 640 reflects the changes to the filesystem represented in the corresponding manifest and change data. In some cases, the filesystem may be unavailable to the facility for logging manifests. For example, the filesystem may lose connectivity with the filesystem, servers in the shared storage system may be disconnected or unplugged, and so on. In these situations the facility may skip the logging process, rather than treating the filesystem as storing nothing, and represent any gaps in the logging of data with a corresponding gap in the visualization data, such as gap 645 shown in display 600.

Figure 7:
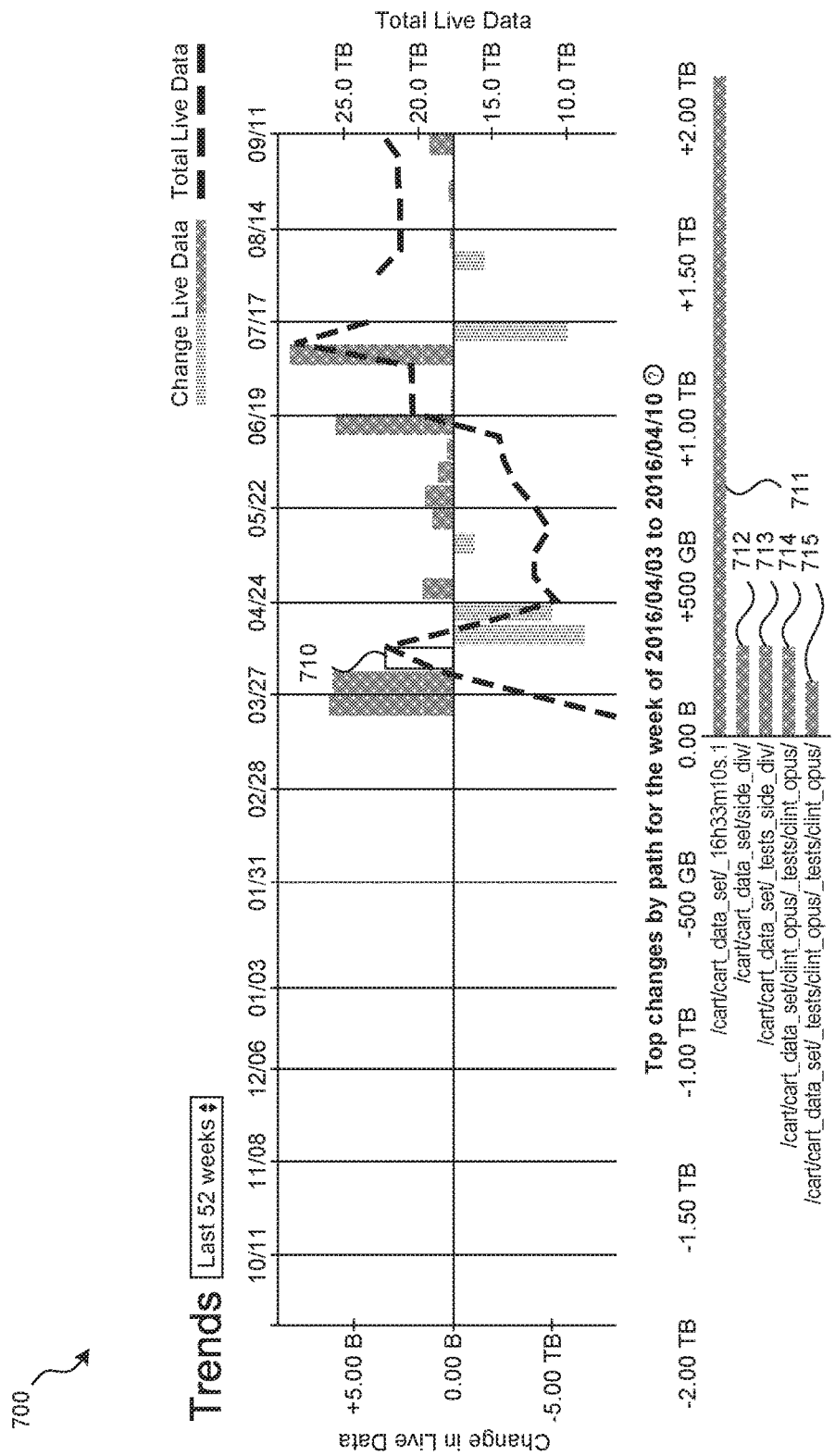
FIGS. 7 and 8 are display diagrams showing example screenshots of a user interface configured to display visualization information for trend data.
Figure 8:
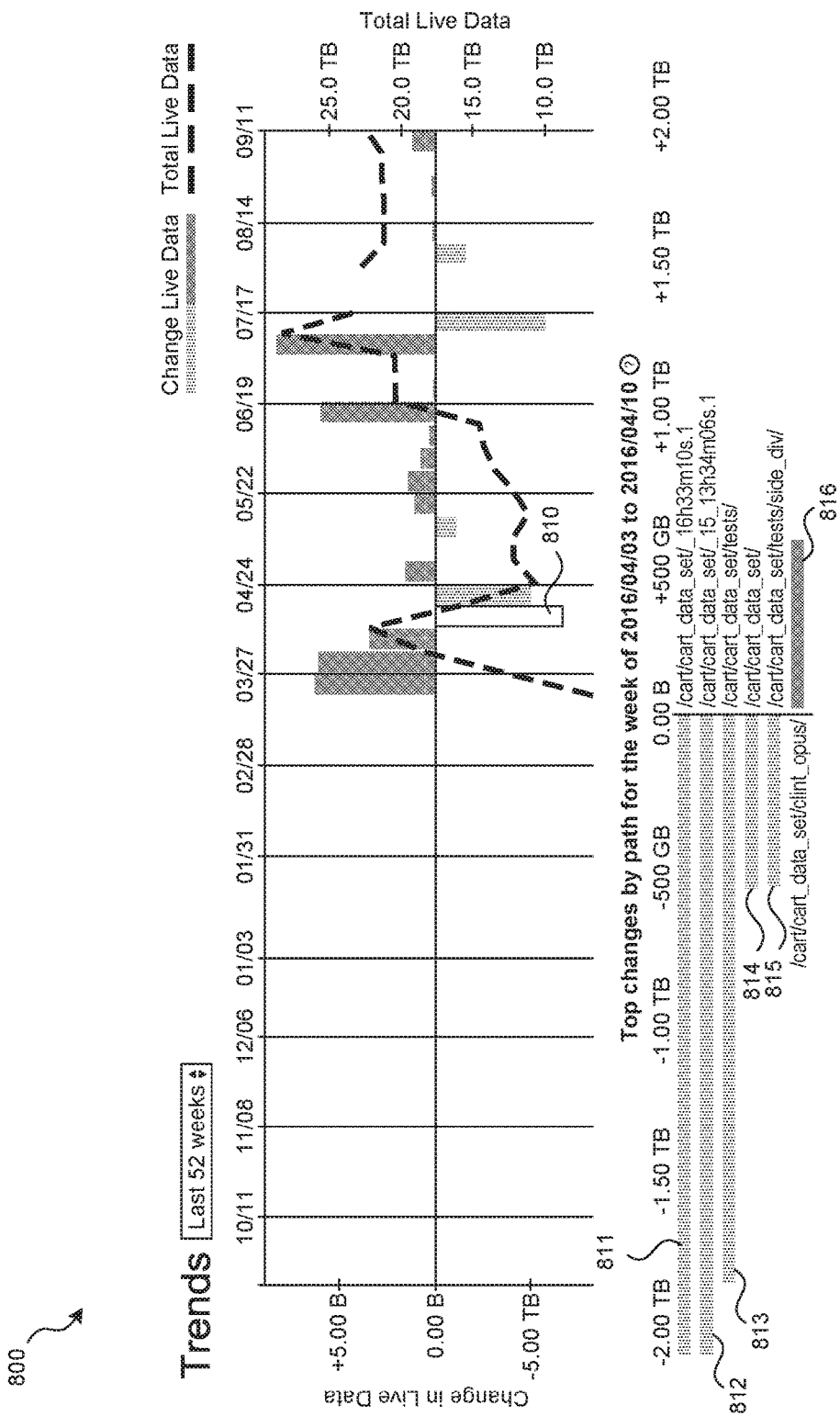

FIGS. 7 and 8 are display diagrams showing example screenshots of a user interface configured to display visualization information for trend data in accordance with some embodiments of the disclosed technology. In these examples, the visualization information includes additional details for selected change data. For example, a user may wish to view information identifying the most significant changes in the filesystem for changes represented by a particular change bar. FIG. 7 shows the results of selecting change bar 710. In response to receiving the selection, the facility identifies the most significant changes (i.e., the filesystem items for which the change was the greatest) between the corresponding manifests and displays the results 711-715. This information can be retrieved from a corresponding change data structure and/or generated by comparing information stored in two manifest data structures. Similarly, FIG. 8 shows the results of selecting change bar 810. In response to receiving the selection, the facility identifies the most significant changes between the corresponding manifests and displays the results 811-816. In some embodiments, the facility may prioritize results based on the change represented by the corresponding change bar. If the change bar shows positive growth, the facility may show the results that represent the most significant positive changes. For example, in FIG. 7, the facility prioritizes positive changes to filesystem items because the sizes of the data used by the system grew over the corresponding period. Thus each of results 711-715 represents a filesystem item that has grown between the corresponding manifests. For example, the file at "/cart/cart_data_set/_16h33m10s.1" grew by over 2 TB. As another example, if the change bar shows decay, the facility may show the results that represent the most significant decays. Alternatively, the facility may show a combination of filesystem items that have grown and that have shrunk. For example, bar 816 in FIG. 8 represents a subdirectory (/cart/cart_data_set/_tests/clint_opus/_tests/clint_opus/) that has grown over the relevant period even though the filesystem as a whole shrunk and each of the other results 811-815 represents a file or subdirectory that has shrunk. In some cases, the facility may allow a user to select how many results are displaying in the user interface.

From the foregoing, it will be appreciated that specific embodiments of the invention have been described herein for purposes of illustration, but that various modifications may be made without deviating from the scope of the invention. For example, while various aspects of the facility are described with reference to filesystem subtrees (e.g., directory structures), one of ordinary skill in the art will recognize that this process can be applied to a variety of hierarchical structures. Furthermore, filesystem data and corresponding change and manifest data may be traversed according to any of several traversal techniques, such as a depth first search, a breadth first search, and so on. Accordingly, the invention is not limited except as by the appended claims.

We claim:

1. A method, in a computing system having a memory and a processor, the method comprising:
   at regular intervals,
      determining a value for a first directory;
      for each of a plurality of paths, each path associated with an item in the first directory, each item comprising a subdirectory or a file,
         determining a value for the item corresponding to the path,
         determining whether the item corresponding to the path is significant at least in part by determining whether the determined value exceeds a first threshold, and
         in response to determining that the item corresponding to the path is significant,
            recording an indication of the path and the value determined for the item corresponding to the path in a manifest data structure;
   generating change data representative of changes between a first point in time and a second point in time at least in part by,
      identifying a first manifest data structure corresponding to the first point in time,
      identifying a second manifest data structure corresponding to the second point in time,
      for each of a plurality of paths,
         determining a first value determined for the item corresponding to the path based at least in part on the first manifest data structure,
         determining a second value determined for the item corresponding to the path based at least in part on the second manifest data structure,
         determining a difference between the determined first value and the determined second value,
         determining whether the path is significant at least in part by determining whether the determined difference exceeds a second threshold, and
         in response to determining that the path is significant, recording the determined difference between the first value and the determined second value in a change data structure; and
   for each of a plurality of change data structures,
      providing for display an indication of the change data stored in the change data structure.

2. The method of claim 1, wherein recording an indication of a first path and the value determined for the item corresponding to the first path comprises storing the indication of the first path and the value determined for the item corresponding to the first path in a manifest data structure.

3. The method of claim 2, wherein the manifest data structure comprises, for each of a plurality of paths:
   an indication of the path; and
   a value determined for an item corresponding to the path.

4. The method of claim 1, wherein recording an indication of a first path and the value determined for the item corresponding to the first path comprises:
   creating a node for a b-tree, wherein the node comprises the first path and the value determined for the item corresponding to the first path; and
   adding the created node to the b-tree.

5. A computer-readable storage medium storing instructions that, when executed by a computing system having a memory and a processor, cause the computing system to perform a method, the method comprising:
   determining a value for a first directory in a filesystem;
   for each of a plurality of paths, each path associated with an item in the first directory, each item comprising a subdirectory of the first directory or a file,
      determining a value for the item corresponding to the path,
      determining whether the item corresponding to the path is significant at least in part by determining whether the determined value exceeds a first threshold, and
      in response to determining that the item corresponding to the path is significant,
         recording an indication of the path and the value determined for the item corresponding to the path.

6. The computer-readable storage medium of claim 5, the method further comprising:
   determining the first threshold at least in part by determining the size of data stored within the filesystem.

7. The computer-readable storage medium of claim 5, wherein determining whether a first item corresponding to a directory is significant comprises determining how many items are stored within the directory.

8. The computer-readable storage medium of claim 5, the method further comprising:
   for each of the plurality of paths,
      determining a second value for the item corresponding to the path, and
      determining whether the item corresponding to the path is significant at least in part by determining whether the value determined for the item corresponding to the path exceeds the first threshold and whether the determined second value exceeds a second threshold.

9. The computer-readable storage medium of claim 5, the method further comprising:
   generating a change data structure based at least in part on differences between two manifest data structures;
   for each of a plurality of entries in the change data structure,
      retrieving, from the change data structure, a value for the entry,
      determining whether the retrieved value for the entry exceeds a second threshold, and
      in response to determining that the retrieved value for the entry exceeds the second threshold,
         generating visualization information for the entry.

10. The computer-readable storage medium of claim 5, wherein determining a value for a first subdirectory comprises:
  determining a size of the contents of the first subdirectory;
  storing the determined size of the contents of the first subdirectory;
  for each item in the first subdirectory,
    determining a size of the item;
  determining the sum of the determined sizes of the items; and
  determining the difference between the determined size of the contents of the first subdirectory and the determined sum of the determined sizes of the items.

11. The computer-readable storage medium of claim 10, the method further comprising:
  determining whether the determined difference exceeds a relevance threshold.

12. The computer-readable storage medium of claim 5, wherein determining a value for a first file comprises determining the size of the file.

13. The computer-readable storage medium of claim 5, wherein determining a value for a first file comprises determining the number of times the file has been accessed during a previous period.

14. The computer-readable storage medium of claim 5, wherein determining the value for the first directory comprises retrieving an aggregated value stored as metadata associated with the first directory.

15. The computer-readable storage medium of claim 5, wherein determining whether a first subdirectory is significant comprises:
  determining a number of items that are stored within a first-level of the first subdirectory; and
  determining that the number of items that are stored within the first-level of the first subdirectory exceeds a second threshold.

16. A computing system comprising:
  a memory;
  a processor;
  a component configured to identify a first manifest data structure corresponding to a first point in time;
  a component configured to identify a second manifest data structure corresponding to a second point in time;
  a component configured to, for each of a plurality of paths, each path corresponding to an item in a filesystem,
    determine a first value for the item corresponding to the path based at least in part on the first manifest data structure,
    determine a second value for the item corresponding to the path based at least in part on the second manifest data structure,
    determine a difference between the determined first value and the determined second value,
    determine whether the path is significant at least in part by determining whether the determined difference exceeds a threshold, and
    in response to a determination that the path is significant, store an indication of the path and the determined difference in a change data structure,
  wherein each component comprises computer-executable instructions stored in the memory for execution by the processor.

17. The computing system of claim 16, wherein the component configured to identify the first manifest data structure corresponding to a first point in time is configured to, for each of a plurality of manifest data structures, compare the first point in time to a time associated with the manifest data structure.

18. The computing system of claim 16, further comprising:
  a component configured to periodically generate manifest data structures for items stored in the filesystem.

19. The computing system of claim 16, further comprising:
  a component configured to generate visualization information for the change data structure.

20. The computing system of claim 16, further comprising:
  a component configured to determine the threshold at least in part by:
    identifying the largest difference determined for the plurality of paths, and
    multiplying the identified largest difference by a predetermined value.

* * * * *